April 21, 1964     T. Z. WILLIAMS     3,129,527
TURKEY CALL
Filed Sept. 16, 1960

INVENTOR
TAYLOR Z WILLIAMS
BY
Charles T. Lovercheck
attorney 3,129,527
TURKEY CALL
Taylor Z. Williams, 401 James St., Flemington, Pa., assignor, by mesne assignments, to Taylor Z. Williams and Wilbur Williams, Flemington and Smethport (respectively), Pennsylvania
Filed Sept. 16, 1960, Ser. No. 56,460
1 Claim. (Cl. 46—177)

This invention relates to bird calls and, more particularly, to improvements in bird calls and, especially, a device adapted for use in imitating the notes of wild turkeys.

In carrying out the invention, it is a purpose thereof to provide a hollow box shaped device having a second hollow box shaped device similar in configuration, yet of a size suitable to interfit snugly into the first device to form a closure for the first device. It has been discovered that because of the difference in size of the two devices, when properly used, the larger device will emit sounds imitating the call of a male turkey and the smaller device will imitate the call of a female turkey or young turkey.

In combination with the device, a piece of slate or other suitable material is provided which is adapted to be held in one hand while one of the first mentioned boxes is held in the palm of the other hand. In this position, the slate is drawn along the edge of the box at an angle approximately thirty degrees thereto. This sets up a vibration in the box imitating the true note of a wild turkey.

In order for the device to operate most efficiently, the box should be held in the palm of the hand with the open top of the box extending between the thumb and the fingers thereof so that the thumb loosely grasps one side of the box adjacent the center and the other side is grasped by the fingers of the operator. The slate is then held in the other hand with one finger on each end thereof and the slate is drawn across one corner of the box to imitate the call of a turkey.

Accordingly, it is an object of the present invention to provide an improved turkey call.

Another object of the invention is to provide a combination box and container, one part of which may be used to imitate a male turkey and the other part to imitate a female turkey.

A further object of the invention is to provide a bird call which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 2:
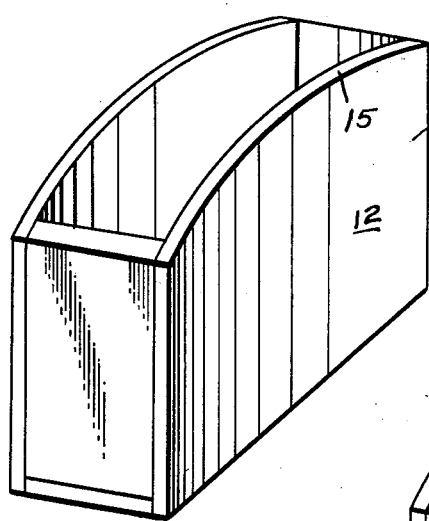
FIG. 2 is a view of the large box in the assembly.
Figure 3:
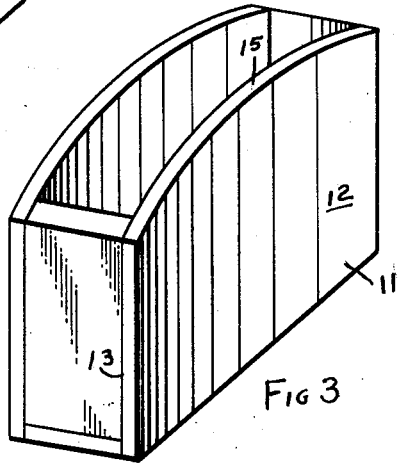
FIG. 3 is a view of the small box making up the assembly of FIG. 1.
Figure 1:
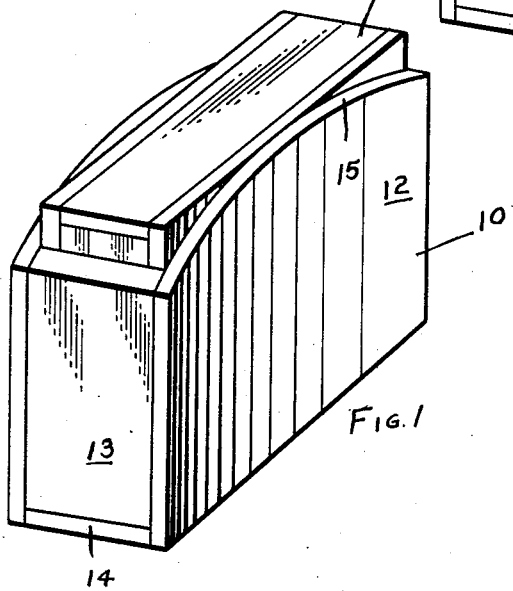
FIG. 1 is a view of the assembly according to the invention.
Figure 4:
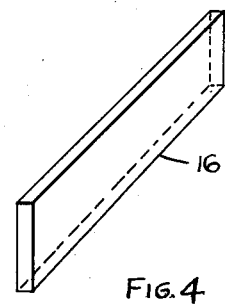

Now with more particular reference to the drawing, two boxes 10 and 11 are shown. Each box has two sides 12 and two ends 13. The sides which form the ends of the elongated box and a bottom 14 are disposed between the two sides 12. It is important that the two sides 12 extend completely down over the bottom 14 and that the bottom does not overlap the sides because this may interfere with the vibration of the sides.

For best results, the material of the sides should be approximately one-eighth inch thick. The ends of the bottom 14 may be slightly thicker. The larger box 10 is approximately three and one-half inches long x one and one-quarter inches wide x three-quarter inch high to the outside edges of the ends. The sides are arched upwardly so that the distance from the crest of the side to the bottom is approximately two and one-half inches. An upper edge 15 of the box is flat; that is, disposed at an angle of approximately ninety degrees to the sides and the upper edge of the ends is slanted to conform to the slope of the arched portions of the sides.

The small box 11 is approximately three and one-quarter inches long x one and one-sixteenth inches wide by one and one-half inches deep at the ends and approximately two inches deep at the center. The edges of the sides of the box are curved about a radius of three and one-half inches. By making the two boxes of these two relative dimensions, the smaller box 11 can fit snugly into the larger box 10 with the outer edges of the sides and ends of the smaller box in close proximity to the inside edges of the sides and ends, respectively, of the larger box and the curved edges of the smaller box disposed in close proximity to the inside surface of the bottom of the larger box and the outside surface of the bottom of the smaller box being substantially tangent to the curved surfaces of the larger box. Therefore, a convenient assembly for carrying is provided.

The slate used can be a thin rectangular piece approximately three inches long x one inch wide x one-sixteenth inch thick. A piece of abrasive paper can be carried along with the slate inside the assembly so that the slate may be kept clean and the abrasive paper can be used to keep the edges of the arched sides of the boxes sharp as well as to keep the slate clean and to keep perspiration from forming a smooth coating thereon.

The boxes themselves are preferably made of cedar wood but they could be made of other hard wood; however, it has been discovered that cedar is the best type of wood for this purpose.

When either of the boxes is held between the thumb and fingers of the hand loosely with the bottom resting in the palm of the hand and the slate held between the thumb and middle finger of the other hand and drawn across the sharp outer curved corner of the box, a vibration is set up in the sides and/or bottom of the box which faithfully imitates the call of a wild turkey. Either a male turkey or a female turkey may be imitated, depending upon which box is used and, from a knowledge of the frequency of notes of the wild turkey's call, an operator can develop a considerable skill in imitating that call.

The foregoing specification sets forth the invention in its preferred practical forms but the structure shown is capable of modification within a range of equivalents without departing from the invention which is to be understood is broadly novel as is commensurate with the appended claim.

The embodiments of the invention in which as exclusive property or privilege is claimed are defined as follows:

A bird call comprising a first open, generally rectangular box and a second open, generally rectangular box made of sheets of cedar wood, the side edges of said boxes being curved upwardly and having sharp edges, and a piece of slate, said slate being adapted to be held in a hand and drawn over said sharp edges on said first box to imitate the sound of an adult turkey, said second box being adapted to closely interfit into said first box with the outer edges of the sides and ends of said second box in close proximity to the inside edges of the sides and ends, respectively, of said first box and the curved edges of said second box disposed in close proximity to the inside surface of the bottom of said first box and the outside surface of the bottom of said second box being substantially tangent to said curved edges of said first box, thereby forming a carrying case, said slate being adapted to be disposed in said carrying case, said second box being adapted to be used alternately with said first box, said second box vibrating at a higher frequency when said slate is rubbed over said sharp edges on said second box than said first box vibrates when said slate is rubbed thereon, producing a higher pitched sound imitating the call of a young or female turkey.

References Cited in the file of this patent

UNITED STATES PATENTS

| | | |
|---|---|---|
| 1,034,307 | Saunders | July 30, 1912 |
| 2,511,403 | Fleener | June 13, 1950 |
| 2,720,054 | Grazier | Oct. 11, 1955 |